United States Patent [19]
Park et al.

[11] Patent Number: 5,837,343
[45] Date of Patent: Nov. 17, 1998

[54] REDUCED-FRICTION COMPOSITE STRUCTURAL ELEMENT

[76] Inventors: Henry H. Park, 2028 Barry Ave., #A, West Los Angeles, Calif. 90025; Edward Y. Park, 2008 Foothill Dr., Fullerton, Calif. 92633

[21] Appl. No.: 712,076

[22] Filed: Sep. 11, 1996

[51] Int. Cl.$^6$ .............. B32B 5/12; B32B 21/04; B32B 23/08
[52] U.S. Cl. .......... 428/109; 428/105; 428/107; 428/110; 428/513; 428/537.1; 472/90
[58] Field of Search .......... 472/90; 428/301.4, 428/105, 107, 109, 110, 513, 537.1

[56] References Cited

U.S. PATENT DOCUMENTS

| | | | |
|---|---|---|---|
| 3,497,211 | 2/1970 | Nagin | 272/56.5 |
| 3,508,945 | 4/1970 | Haemer | 117/8 |
| 3,552,746 | 1/1971 | Nagin | 272/3 |
| 3,771,891 | 11/1973 | Nirenski et al. | 404/40 |
| 3,950,599 | 4/1976 | Board, Jr. | 428/236 |
| 4,012,551 | 3/1977 | Bogaty et al. | 428/192 |
| 4,030,729 | 6/1977 | Nathaniel | 272/3 |
| 4,093,268 | 6/1978 | Sampson et al. | 280/610 |
| 4,102,046 | 7/1978 | Downing et al. | 301/346.53 |
| 4,141,873 | 2/1979 | Dohany | 260/29.6 |
| 4,169,688 | 10/1979 | Toshio | 404/40 |
| 4,169,904 | 10/1979 | Czornyj et al. | 427/44 |
| 4,178,273 | 12/1979 | Brown | 260/294 |
| 4,194,040 | 3/1980 | Breton et al. | 428/308 |
| 4,196,249 | 4/1980 | Patrichi | 428/242 |
| 4,208,462 | 6/1980 | Dauphin et al. | 428/265 |
| 4,241,144 | 12/1980 | Hendy | 428/516 |
| 4,255,462 | 3/1981 | Gebauer et al. | 427/27 |
| 4,310,588 | 1/1982 | Bareel | 428/251 |

OTHER PUBLICATIONS

Advertising Circular for "HyDense" calcium stearate, published by Mallincrkrodt, Inc., St. Louis, Missouri, undated.
Advertising Circular for "Roseburg Superply" plywood, published by Roseburg Forest Prod., Roseburg, Oregon, undated.
Data Sheet for "Marlex" plastic, published by Philips Petroleum Corp., Houston, Texas, Aug. 1983.
Data Sheet for Paxon 8A50–100 high density polyethylene, publ. by Paxon Polymer Co., Baton Rouge, Louisiana, undated.
Data Sheet for Stryk 249 A/B adhesive, published by Environmental Chemical Products, undated.

*Primary Examiner*—Ponnathapura Achutamurthy
*Attorney, Agent, or Firm*—Merchant, Gould, Smith, Edell, Welter & Schmidt

[57] ABSTRACT

A low-friction composite structure according to the present invention comprises: (1) a core material with a uniform cross section and having dimensional stability, the core material having two substantially planar surfaces; and (2) at least one polymer layer adhesively attached to one of the substantially planar faces of the core material, the polymer layer having applied thereto a friction-reducing ingredient selected from the group consisting of silicone resins and silicone oils. Preferably, the low-friction composite structure is constructed in segments, with the segments being assembled by groove-and-spline assembly to form the structure, such as through splines. Various additives, such as anti-oxidants, titanium dioxide, thermic stabilizers, ultraviolet stabilizers, hydrophobic ingredients, release agents, and anti-static ingredients, can be added to the polymer layer. Preferably, the polymer is polyethylene.

8 Claims, 2 Drawing Sheets

COMPOSITION OF POLYMER LAYER

| Ingredient | Chemical Name | Percentage |
|---|---|---|
| Polymer | High molecular weight polyethylene | 98.7877% |
| Optical Brightener | Coumarin derivative | 0.022% |
| Antioxidant | Butylhydroxytoluene | 0.0099% |
| Antioxidant | Octodecyl-3, 5-di-tert-butyl-4-hydroxyhydrocinnamate | 0.05% |
| Hydrophobic Ingredient | Calcium Stearate | 0.2004% |
| Ultraviolet Stabilizer | 2- (2"-hydroxy-3'-5'-di-tert-amylphenyl) benzotriazole | 0.25% |
| Ultraviolet Stabilizer | bis (2, 2, 6, 6-tetramethyl-4-piperidinyl) sebacate | 0.25% |
| Antistatic Ingredient | Glycerol ester | 0.1% |
| Titanium Dioxide | $TiO_2$ | 0.33% |
| Pigments | Inorganic pigments | 0.0169% |

*FIGURE 3*

REDUCED-FRICTION COMPOSITE STRUCTURAL ELEMENT

BACKGROUND OF THE INVENTION

The present invention is directed to reduced-friction composite structure elements particularly suited for use as artificial ice skating rinks.

The sport of ice skating is widely popular and is widely practiced. However, the practice of this sport on natural ice requires either the provision of an outdoor rink of suitable size or the provision of an indoor rink. The construction and maintenance of outdoor rinks are dependent on the vagaries of weather and such rinks are impractical in warm climates. Although enclosed rinks using natural ice can be constructed, such rinks require the installation of extensive refrigeration systems to keep the ice surface at the proper temperature and prevent melting. Whether outdoor or indoor, rinks composed of natural ice also require periodic resurfacing to maintain an ice surface smooth and even enough to allow skating. Such resurfacing is normally accomplished by an expensive self-propelled ice surface refinishing machine often referred to as a Zamboni machine.

To overcome these difficulties, several types of artificial skating rinks have been prepared. Such artificial rinks or skating elements are described, for example, in U.S. Pat. No. 3,497,211 to Nagin, U.S. Pat. No. 3,508,945 to Haemer et al., U.S. Pat. No. 3,552,746 to Nagin, U.S. Pat. No. 4,030,729 to Nathaniel, and U.S. Pat. No. 4,310,588 to Bareel, all of which are incorporated herein by this reference.

However, there still exists a need for an improved artificial ice skating surface that is economical to install and operate, that is durable, and that provides a consistent surface that is suitable for skating.

In addition to their use in artificial skating rinks, low-friction composite surfaces have a multitude of other uses. Such low-friction elements are described, for example in U.S. Pat. No. 3,950,599 to Board, Jr., U.S. Pat. No. 4,012,551 to Bogaty et al., U.S. Pat. No. 4,093,268 to Sampson et al., U.S. Pat. No. 4,102,046 to Downing et al., U.S. Pat. No. 4,131,711 to Attwood, U.S. Pat. No. 4,141,873 to Dohany, U.S. Pat. No. 4,156,059 to Hodes et al., U.S. Pat. No. 4,169,904 to Czornyj et al., U.S. Pat. No. 4,178,273 to Brown, U.S. Pat. No. 4,194,040 to Breton et al., U.S. Pat. No. 4,196,249 to Patrichi, U.S. Pat. No. 4,208,462 to Dauphin et al., U.S. Pat. No. 4,232,089 to Bordini et al., U.S. Pat. No. 4,241,144 to Hendy, and U.S. Pat. No. 4,255,462 to Gebauer et al.

However, there exists a need for an improved composite structure presenting low friction properties that can be incorporated into a surface and provide high dimensional stability and durability, together with a consistent friction-reducing property.

SUMMARY

We have developed low-friction composite structures that are suitable for use as artificial ice skating surfaces, as well as for other uses.

In general, low-friction composite structures according to the present invention comprise:

(1) a core material with a uniform cross section and having dimensional stability, the core material having two substantially planar surfaces; and (2) at least one polymer layer adhesively attached to one of the substantially planar faces of the core material, the polymer layer having applied thereto a friction-reducing ingredient selected from the group consisting of silicone resins and silicone oils.

Typically, the structure comprises two polymer layers, each adhesively attached to one of the substantially planar faces of the core material.

The core material can be wood; preferably, the wood is selected from the group consisting of Baltic birch plywood, Finnish birch plywood, Douglas fir plywood, and medium density fiberboard impregnated with phenolic resin. Alternatively, the core material can be a structural plastic foam.

Typically, the polymer is selected from the group consisting of polyethylene, polypropylene, polycarbonate, polyethylene terephthalate, polydiallyl ester, polytetrafluoroethylene, polymonochlorotrifluoroethylene, copolymers of tetrafluoroethylene and hexafluoropropane, copolymers of tetrafluoroethylene and ethylene, polyvinylidene fluoride, epoxy resins, polyurethane, melamine resins, polyvinyl alcohol, and polyvinyl chloride. Preferably, the polymer is polyethylene such as a high molecular weight polyethylene (HMWPE) or a high density polyethylene (HDPE).

The polymer layer can further comprise a hydrophobic ingredient selected from the group consisting of calcium stearate, calcium palmitate, magnesium stearate, magnesium palmitate, stearic acid, and palmitic acid. The hydrophobic ingredient can also act as a release agent.

The polymer layer can further comprise a release agent selected from the group consisting of Cytec 3346, Cytec 6411, and polyethylene glycol 2000. This release agent is in addition to the hydrophobic ingredient.

Similarly, the polymer layer can further comprise an anti-static ingredient selected from the group consisting of glycerol, glyceryl monooleate, glyceryl monostearate, other glycerol esters, ethyl monostearate, and glycerides. Preferably, the anti-static ingredient is glycerol.

The polymer layer can further comprise an ultraviolet stabilizer. The ultraviolet stabilizer can be selected from the group consisting of 2-alkyl-(2-hydroxyphenyl)-2H-benzotriazole, benzophenones, triazine, phosphonates, resorcinol monobenzoate, bis(2,2,6,6-tetramethyl-4-piperidinyl)sebacate, 2-(2"-hydroxy-3',5'-di-tert-amylphenyl)benzotriazole, Tinuvin 327, Siasorb UV531, Tinuvin 622 and 783, Siasorb 3346, and UVAsorb HA88.

Similarly, the polymer layer can further comprise a thermic stabilizer selected from the group consisting of Weston 618-HT, Weston HPM-12, and TLPE.

The polymer layer can further comprise titanium dioxide as a pigment.

The polymer layer can further comprise an anti-oxidant selected from the group consisting of butylhydroxytoluene, butylated hydroxyanisole, and octodecyl 3,5-di-tert-butyl-4-hydroxyhydrocinnamate.

Preferably, the at least one polymer layer is adhesively attached to one of the substantially planar faces of the core material by a two-part epoxy adhesive.

Another aspect of the present invention is a segmented low-friction composite structure comprising at least two segments, each segment comprising:

(1) a core material with a uniform cross section and having dimensional stability, the core material having two substantially planar surfaces; and (2) at least one polymer layer adhesively attached to one of the substantially planar faces of the core material, the polymer layer having applied thereto a friction-reducing ingredient selected from the group consisting of silicone resins and silicone oils.

The segments are assembled by groove-and-spline assembly to form the structure. Preferably, the groove-and-spline assembly occurs through splines attaching each segment to at least one other segment.

BRIEF DESCRIPTION OF THE DRAWINGS

These and other features, aspects, and advantages of the present invention will become better understood with reference to the following description, appended claims, and accompanying drawings where:

FIG. 3 is a table showing a preferred composition for the polymer layer of the present invention.

DESCRIPTION

Figure 1:
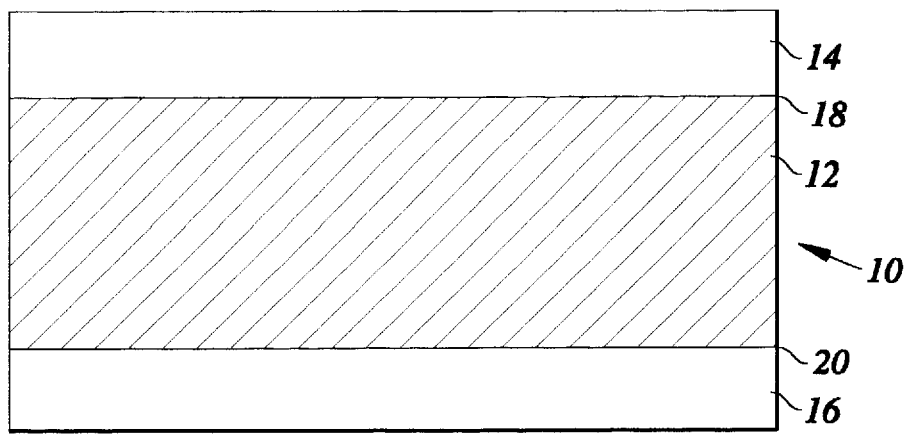
FIG. 1 depicts a cross-sectional view of a low-friction composite structure according to the present invention.

We have developed a low-friction composite structure particularly suitable for use as an artificial ice skating surface.

One embodiment of this low-friction composite structure comprises:

(1) a core material with a uniform cross-section and having dimensional stability, the core material having two substantially planar surfaces; and (2) at least one polymer layer adhesively attached to one of the substantially planar faces of the core material, the polymer layer having applied thereto a friction-reducing ingredient selected from the group consisting of silicone resins and silicone oils.

Typically, the composite structure comprises two polymer layers, each adhesively attached to one of the substantially planar faces of the core material.

The core material can be wood. As used herein, the term "wood" is used to refer to all cellulose-based structural materials comprising or derived from wood including, but not limited to, natural solid wood, plywood, fiberboard, wood composites, wood laminates, and other wood-derived structural materials. Typically, the wood is selected from the group consisting of Baltic birch plywood, Finnish birch plywood, Douglas fir plywood, and medium density fiberboard impregnated with phenolic resin.

The core material can alternatively be a structural plastic foam, such as polyethylene foam.

The polymer can be, but is not limited to one of the following polymers: polyethylene, polypropylene, polycarbonate, polyethylene terephthalate, polydiallyl ester, polytetrafluoroethylene, polymonochlorotrifluoroethylene, copolymers of tetrafluoroethylene and hexafluoropropane, copolymers of tetrafluoroethylene and ethylene, polyvinylidene fluoride, epoxy resins, polyurethane, melamine resins, polyvinyl alcohol, and polyvinyl chloride. Preferably, the polymer is polyethylene. A particularly suitable polyethylene is a high molecular weight polyethylene such as a 5100 series high molecular weight polyethylene available from various suppliers such as Philips and General Electric, also available under the trade names Paxxon BA50-100 and Marlex HXM 50100. Other polyethylene resins can be used, such as the DuPont Eltrex B5920 high density polyethylene.

The composite structure can further comprise a hydrophobic ingredient incorporated in the polymer layer. This hydrophobic ingredient can be selected from the group consisting of calcium stearate, calcium palmitate, magnesium stearate, magnesium palmitate, stearic acid, and palmitic acid. Preferably the hydrophobic ingredient is calcium stearate. Other alternative hydrophobic ingredients can also be used. Such hydrophobic ingredients also serve as release agents and allow removal of the plastic from the mold.

The composite structure can further comprise, incorporated in the polymer layer, an anti-static ingredient selected from the group consisting of glycerol, glyceryl monooleate, glyceryl monostearate, other glycerol esters, ethyl monostearate, and glycerides. Preferably, the anti-static ingredient is glycerol or a glycerol ester.

The composite structure can further comprise, in the polymer layer, at least one ultraviolet stabilizer. The ultraviolet stabilizer can be selected from the group consisting of 2-alkyl-(2-hydroxyphenyl)-2H-benzotriazole, benzophenones, triazine, phosphonates, resorcinol monobenzoate, bis(2,2,6,6-tetramethyl-4-piperidinyl) sebacate (Tinuvin 770), 2-(2"-hydroxy-3',5'-di-tert-amylphenyl)benzotriazole (Tinuvin 328), Tinuvin 327, Siasorb UV531, Tinuvin 622 and 783, Siasorb 3346, and UVAsorb HA88.

The composite structure can further comprise, in the polymer layer, at least one thermic stabilizer. The thermic stabilizer can be selected from the group consisting of Weston 618-HT, Weston HPM-12, and TLPE.

The composite structure can further comprise, in the polymer layer, an anti-oxidant. The anti-oxidant can be selected from the group consisting of butylhydroxytoluene, butylated hydroxyanisole, and octodecyl 3,5-di-tert-butyl-4-hydroxyhydrocinnamate (known as Irganox 1076 and Dovernox 76). Preferably, the anti-oxidant is butylhydroxytoluene and octodecyl 3,5-di-tert-butyl-4-hydroxyhydrocinnamate.

The composite structure can further comprise, in the polymer layer, at least one release agent to facilitate the extrusion process and provide a degree of internal lubricity to the surface of the composite structure. This release agent is in addition to the hydrophobic ingredient. The release agent can be selected from the group consisting of Cytec 3346, Cytec 6411, and polyethylene glycol 2000.

The composite structure can further comprise, in the polymer layer, titanium dioxide as a coloring agent to give the surface a uniform white appearance.

Other coloring agents and optical brighteners can be used in the polymer layer. One particularly preferred coloring agent is a blue dye type 82 known as marine blue. A particularly preferred optical brightener is a coumarin derivative known as Uvitex OB or Leucophor EGM. In addition, various inorganic tinting pigments can be used.

Optionally, other ingredients can be incorporated into the polymer layer of the composite structure. These include compounds that provide fire-resistance and/or self-extinguishing capabilities, such as chloride, or phosphate ions, or triethylenephosphoramide. Alternatively, the polymer layer can contain at least one ingredient that provides anti-rodent, anti-microbial, or anti-parasitic properties to the structure. Such ingredients can include isomers of trichlorobenzene, orthodichlorobenzene, 2-pivaloyl-1,3-indadione, benzophenone, and tin derivatives. Other additives known in the art can also be used.

The polymer layer is typically extruded in thicknesses ranging from 4 to 7 millimeters as indicated by the anticipated frequency and severity of use and the desired service life.

Typically, the high molecular weight polyethylene sheet is extruded with a smooth finish on top and a matte finish on the sides to be bonded to one of the substantially planar faces of the core material. The matte finish increases the surface area of the sheet and, thus, increases the strength of the bond to the core material.

Typically, the matte finish side of the high molecular weight polyethylene sheet is flame-treated to a Dyne reading of 60+. The treated polymer is immediately bonded to the core material under about one atmosphere of pressure using vacuum bag technology as used in the aerospace industry. Hydromechanical, flat platen presses can also be used in the bonding process.

Typically, the at least one polymer layer is adhesively attached to one of the substantially planar faces of the core material by a two-part epoxy adhesive such as Stryk 249A and B or the equivalent. The assembled elements are kept under pressure for six hours minimum and further cured at room temperature for an additional 48 to 96 hours before further processing.

A polymer layer can be attached to one or both of the substantially planar faces of the core material, depending on the anticipated service life of the composite structure. If an extended life is required, a double-sided structure can simply be turned over to expose an entirely new surface.

Once the bonded panels are cured, they are machined to the required dimensions.

A cross-sectional view of a low-friction composite structure according to the present invention is shown in FIG. 1. The structure 10 comprises a core material 12 and, in this example, two polymer layers 14 and 16. The two polymer layers 14 and 16 are bonded to planar surfaces 18 and 20 of the core material 12.

Although composite structures according to the present invention can be produced as unitary structures, it is typically preferred to assemble low-friction surfaces according to the present invention in segments so that the structure comprises at least two segments. Each segment comprises:

(1) a core material with a uniform cross-section and having dimensional stability, the core material having two substantially planar surfaces; and (2) at least one polymer layer adhesively attached to one of the substantially planar faces of the core material, the polymer layer having applied thereto a friction-reducing ingredient selected from the group consisting of silicone resins and silicone oils. The segments are assembled by groove and spline assembly to form the structure.

Various additives can be used as described above.

Preferably the groove and spline assembly occurs through the use of precisely machined splines attaching each segment to at least one other segment. Thus, assembly of the segments occurs without the use of nails or glue. The splines hold the panels in precise vertical alignment.

Figure 2:
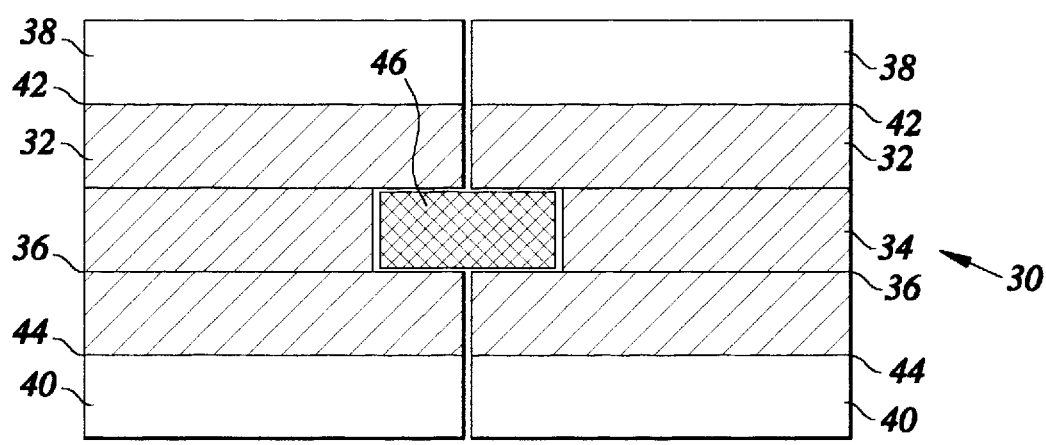
FIG. 2 depicts a segmented composite structure according to the present invention in cross-section through two segments.

A segmented composite structure according to the present invention is shown in FIG. 2 in cross-section through two segments. The structure 30 comprises two segments 32 and 34. Each segment in turn comprises a core material 36 and two polymer layers 38 and 40 adhesively bonded to first and second surfaces 42 and 44 of the core material 36. The first and second segments 32 and 34 are connected via the spline 46.

Preferably, the spline is made of a durable polymer such as polyvinyl chloride or an acrylonitrile-butadiene-styrene (ABS) copolymer. A particularly preferred spline is an ABS Polylac spline.

Although composite structures according to the present invention can be produced without a friction-reducing ingredient, it is generally preferred to have a friction-reducing ingredient applied to the polymer layer. This friction-reducing polymer layer is typically selected from the group consisting of silicone resins and silicone oils. Preferably, the friction-reducing ingredient is a high-viscosity silicone oil such as Dow Corning 510 fluid which comprises trimethyl terminated dimethylphenylmethyl polysiloxane. This silicone fluid has a viscosity of 30,000 Centistokes. Typically, the silicone fluid is dissolved in an inert hydrocarbon-based solvent such as Shell solvent T. Other hydrocarbon-based solvents containing primarily aliphatic and aromatic hydrocarbons and that do not react with the silicone can alternatively be used. Other high-viscosity silicones can be used such as Basildon from Bayer. Other high molecular weight silicones can also be used.

Other alternative embodiments of friction-reducing structures according to the present invention are possible. For example, the polymer layer can be mechanically reinforced and dimensionally stabilized by internal reinforcements, such as bundles of twisted parallel glass fibers. The bundles of glass fibers can form a lattice with an open square or rectangular mesh or can be intertwined so as to form a woven glass fabric. The reinforcement can alternatively consist of a pad or matting of glass fibers that are cut up and bonded with a binder or mechanically linked by interlacing. Alternatively, each reinforcement, known in this alternative, as a high modulus reinforcement, can be made up of two plies of parallel glass fibers. The plies are placed one above the other and their fibers are aligned at right angles to one another. The plies are linked to each other by small interlocking threads. These arrangements, however, are not preferred.

Typically, the composite structures of the present invention are installed over a minimum 6 mm jute or industrial carpet liner to provide a measure of resiliency to the surface and offer a degree of self-leveling to slightly irregular base surfaces.

When composite structures according to the present invention are used for skating, the silicone is typically applied every other day to maintain a consistent glide factor of 90%, as well as preserving the surface. By comparison, wet ice starts with an initial glide factor of 100%, but the glide factor gradually diminishes to 85% during the second hour of skating. By the third hour of skating, the glide factor has decreased to 78% or less. At this point, the ice must be resurfaced with a Zamboni machine.

EXAMPLE

The invention is illustrated by the following Example. This Example is for illustrative purposes only and is not to be construed as limiting the scope of the invention in any manner.

A preferred composition of the polymer layer suitable for use in the structures of the present invention is shown in FIG. 3.

ADVANTAGES OF THE INVENTION

The present invention provides a low-friction composite structure that is suitable as a ice skating surface. Conventional ice skates can be used for skating on the surface. The surface is capable of simulating the gliding properties of natural ice while eliminating the excessive energy requirements associated with the maintenance of natural ice, without the high cost of initial installation, daily maintenance or refrigeration required when natural ice is used as a skating surface.

Professional figure skaters have found that composite structures according to the present invention are easier to skate on than are natural ice because of the consistent 90% glide factor and virtually grooveless surface. Additionally, the surface has been described by skaters as "safer than wet ice" because there is no need to refrigerate the surface, thereby resulting in less muscle strain and less fatigue as compared to skating on natural wet ice. Instructors have also found that students learn to skate more quickly and in less time, due primarily to the fact that teachers can teach for longer intervals and maintain the attention of the students. Conventional steel bladed skates can be used, unlike with several other artificial ice skating surfaces.

There is no downtime to refinish the skating surface, and maintenance consists only of vacuuming the surface at the end of each day's skating, washing the surface once or twice each month, and periodic application of the friction-reducing ingredient.

Composite structures according to the present invention are quick and easy to install, requiring no plumbing or refrigeration when used for skating surfaces, and can be used for 12 months of the year. No refrigerant or freon, with its increased cost and environmental hazards, is required. Composite structures according to the present invention resist bacterial infection, are non-flammable, and are non-toxic. They can be installed on any solid surface. The preparation of composite structures that contain two polymer layers allows doubling of the period of use.

Composite friction-reducing structures according to the present invention can be installed on any solid surface and can be installed in either a portable or permanent manner.

The composite friction-reducing structures of the present invention can be used in other applications than skating rinks with similar advantages.

Although the present invention has been described in considerable detail, with reference to certain preferred variations thereof, other versions and embodiments are possible. Therefore the scope of the invention is determined by the following claims.

We claim:

1. A segmented low-friction composite structure comprising at least two segments, each segment comprising:
   (a) a core material of Baltic birch plywood with a uniform cross section and having dimensional stability, the core material having two substantially planar surfaces; and
   (b) at least one polyethylene polymer layer adhesively attached to one of the substantially planar faces of the core material by an epoxy adhesive, the polymer layer substantially lacking cavities, the polymer layer having applied thereto silicone oil, the polymer layer further comprising:
      (i) calcium stearate;
      (ii) a glycerol ester;
      (iii) bis(2,2,6,6-tetramethyl-4-piperidinyl)sebacate;
      (iv) 2-(2"-hydroxy-3',5'-di-tert-amylphenyl)benzotriazole;
      (v) butylhydroxytoluene; and
      (vi) octyldodecyl 3,5-di-tert-butyl4-hydroxyhydrocinnamate;
the segments being assembled to form the structure.

2. A segmented low-friction composite structure comprising at least two segments, each segment comprising:
   (a) a core material of Baltic birch plywood with a uniform cross section and having dimensional stability, the core material having two substantially planar surfaces; and
   (b) at least one polyethylene polymer layer adhesively attached to one of the substantially planar faces of the core material by an epoxy adhesive, the polymer layer substantially lacking cavities, the polymer layer having applied thereto silicone oil, the polymer layer further comprising:
      (i) calcium stearate;
      (ii) a glycerol ester;
      (iii) bis(2,2,6,6-tetramethyl-4-piperidinyl)sebacate;
      (iv) 2-(2"-hydroxy-3',5'-di-tert-amylphenyl)benzotriazole;
      (v) butylhydroxytoluene;
      (vi) octyldodecyl 3,5-di-tert-butyl-4-hydroxyhydrocinnamate;
      (vii) titanium dioxide;
      (viii) a derivative of coumarin; and
      (ix) a tinting pigment;
the segments being assembled to form the structure.

3. A segmented low-friction composite structure comprising at least two segments, each segment comprising:
   (a) a core material with a uniform cross section and having dimensional stability, the core material having two substantially planar surfaces, the core material having grooves for insertions of splines; and
   (b) at least one polymer layer adhesively attached to one of the substantially planar faces of the core material, the polymer layer being attached to the substantially planar faces of the core material, the polymer layer having applied thereto a friction-reducing ingredient selected from the group consisting of silicone resins and silicone oils; the structure further comprising splines for insertion into the grooves in the core material; the segments being assembled by groove-and-spline assembly to form the structure.

4. A segmented low-friction composite structure comprising at least two segments, each segment comprising:
   (a) a core material of Baltic birch plywood with a uniform cross section and having dimensional stability, the core material having two substantially planar surfaces, the core material having grooves for insertion of splines; and
   (b) at least one polyethylene polymer layer adhesively attached to one of the substantially planar faces of the core material by an epoxy adhesive, the polymer layer having applied thereto silicone oil, the polymer layer further comprising:
      (i) calcium stearate;
      (ii) a glycerol ester;
      (iii) bis(2,2,6,6-tetramethyl-4-piperidinyl)sebacate;
      (iv) 2-(2"-hydroxy-3',5'-di-tert-amylphenyl)benzotriazole;
      (v) butylhydroxytoluene; and
      (vi) octyldodecyl 3,5-di-tert-butyl-4-hydroxyhydrocinnamate;
the structure further comprising splines for insertion into the grooves in the core material; the segments being assembled by groove-and-spline assembly to form the structure.

5. A segmented low-friction composite structure comprising at least two segments, each segment comprising:
   (a) a core material of Baltic birch plywood with a uniform cross section and having dimensional stability, the core material having two substantially planar surfaces, the core material having grooves for insertion of splines; and
   (b) at least one polyethylene polymer layer adhesively attached to one of the substantially planar faces of the core material by an epoxy adhesive, the polymer layer having applied thereto silicone oil, the polymer layer further comprising;

(i) calcium stearate,
(ii) a glycerol ester;
(iii) bis(2,2,6,6-tetramethyl-4-piperidinyl)sebacate;
(iv) 2-(2"-hydroxy-3',5'-di-tert-amylphenyl) benzotriazole;
(v) butylhydroxytoluene;
(vi) octyldodecyl 3,5-di-tert-butyl-4-hydroxyhydrocinnamate;
(vii) titanium dioxide;
(viii) a derivative of coumarin; and
(ix) a tinting pigment;

the structure further comprising splines for insertion into the grooves in the core material; the segments being assembled by groove-and-spline assembly to form the structure.

6. A segmented low-friction composite structure comprising at least two segments, each segment comprising:
   (a) a core material with a uniform cross section and having dimensional stability, the core material having two substantially planar surfaces; and
   (b) two polymer layers adhesively attached to each of the two substantially planar faces of the core material, the polymer layers having applied thereto a friction-reducing ingredient selected from the group consisting of silicone resins and silicone oils; the segments being assembled to form the structure.

7. A segmented low-friction composite structure comprising at least two segments, each segment comprising:
   (a) a core material of Baltic birch plywood with a uniform cross section and having dimensional stability, the core material having two substantially planar surfaces; and
   (b) two polyethylene polymer layers adhesively attached to each of the two substantially planar faces of the core material by a epoxy adhesive, the polymer layer having applied thereto silicone oil, the polymer layer further comprising:
      (i) calcium stearate;
      (ii) a glycerol ester;
      (iii) bis(2,2,6,6-tetramethyl-4-piperidinyl)sebacate;
      (iv) 2-(2"-hydroxy-3',5'-di-tert-amylphenyl) benzotriazole;
      (v) butylhydroxytoluene; and
      (vi) octyldodecyl 3,5-di-tert-butyl-4-hydroxyhydrocinnamate;

the segments being assembled to form the structure.

8. A segmented low-friction composite structure comprising at least two segments, each segment comprising:
   (a) a core material of Baltic birch plywood with a uniform cross section and having dimensional stability, the core material having two substantially planar surfaces; and
   (b) two polyethylene polymer layers adhesively attached to each of the two substantially planar faces of the core material by an epoxy adhesive, the polymer layer having applied thereto silicone oil, the polymer layer further comprising:
      (i) calcium stearate;
      (ii) a glycerol ester;
      (iii) bis(2,2,6,6-tetramethyl-4-piperidinyl)sebacate;
      (iv) 2-(2"-hydroxy-3',5'-di-tert-amylphenyl) benzotriazole;
      (v) butylhydroxytoluene;
      (vi) octyldodecyl 3,5-di-tert-butyl-4-hydroxyhydrocinnamate;
      (vii) titanium dioxide;
      (viii) a derivative of coumarin; and
      (ix) a tinting pigment:

the segments being assembled to form the structure.

* * * * *

UNITED STATES PATENT AND TRADEMARK OFFICE
Certificate

Patent No. 5,837,343                                      Patented: November 17, 1998

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Henry H. Park, West Los Angeles, CA.

Signed and Sealed this Seventeenth Day of September 2002.

<div style="text-align:right">

PONNATHAPURA N. ACHUTAMURTHY
*Supervisory Patent Examiner*
Art Unit 1652

</div>